No. 819,788. PATENTED MAY 8, 1906.
C. C. NEALE.
SEALING DEVICE FOR WEIGHING SCALES.
APPLICATION FILED JULY 8, 1904.
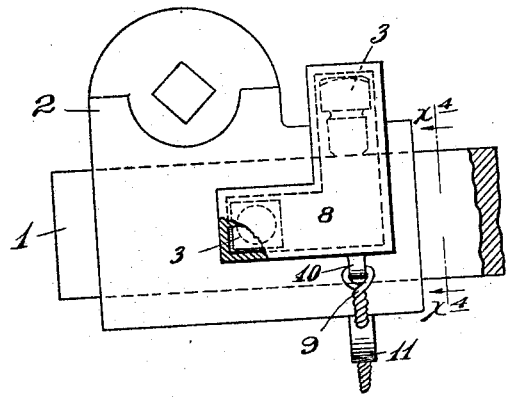
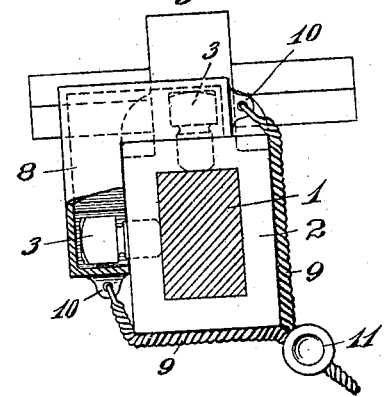
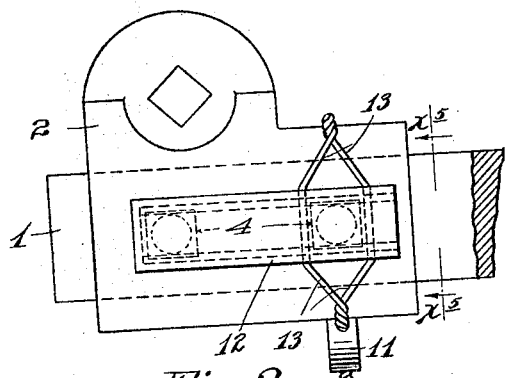
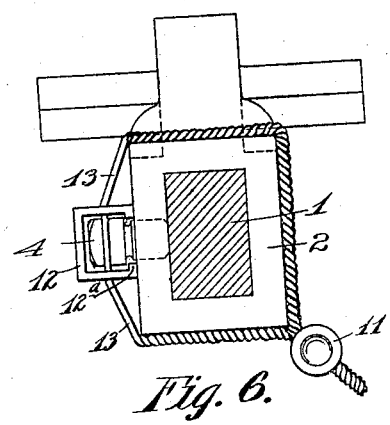
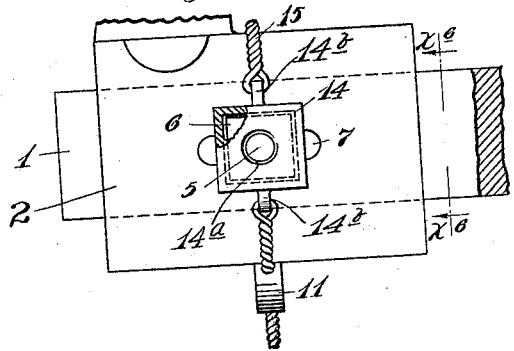
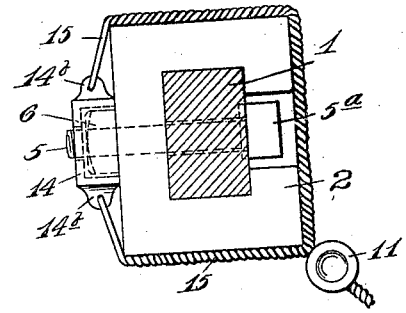
Witnesses.
E. W. Jeppesen.
R. C. Mabry.
Inventor.
Charles C. Neale.
By his Attorneys.
Williamson Merdian

UNITED STATES PATENT OFFICE.

CHARLES C. NEALE, OF MINNEAPOLIS, MINNESOTA.

SEALING DEVICE FOR WEIGHING-SCALES.

No. 819,788.

Specification of Letters Patent.

Patented May 8, 1906.

Application filed July 8, 1904. Serial No. 215,727.

*To all whom it may concern:*

Be it known that I, CHARLES C. NEALE, a citizen of the United States, residing at Minneapolis, in the county of Hennepin and State of Minnesota, have invented certain new and useful Improvements in Sealing Devices for Weighing-Scales; and I do hereby declare the following to be a full, clear, and exact description of the invention, such as will enable others skilled in the art to which it appertains to make and use the same.

My present invention has for its object to provide a simple and efficient sealing device for the so-called "nose-iron" of scale-levers;
and to such ends it consists of the novel devices and combinations of devices hereinafter described, and defined in the claim.

As is a well-known fact, weighing-scales are set for accurate work by proper adjustments of the so-called "nose-iron" on the scale-levers, and any movement of said nose-irons from their properly-set positions will cause the scale to overweigh or underweigh, according to the direction in which the nose-iron is moved. Scales of this character, which are used for public purposes, are generally under the supervision of a public inspector, whose duty it is to test the scales from time to time, readjust them, if necessary, and to leave them set properly adjusted. For instance, scales used for weighing grain at elevators and various other places are under the supervision of State scale-inspectors. When the scales are sent out from the factory the nose-irons are properly set on the scale-levers, usually by means of set-screws, but sometimes by means of nutted bolts, and it is customary to apply on the scale a notice stating that the nose-iron should not be tampered with or moved. Nevertheless, inspectors find that these nose-irons are frequently forced or moved from their proper set positions, and as it usually happens that scales thus out of adjustment are set to weigh to the advantage of the person operating them the natural presumption arises that the scales are intentionally set out of adjustment.

The object of this invention is to provide a device which will absolutely prevent the nose-iron of the scale from being tampered with or reset or thrown out of its proper adjustment without leaving absolute proofs that such manipulation was done maliciously or at least intentionally.

The invention consists, broadly, in applying a seal to the nose-iron or to parts which hold the same in such manner that the said nose-iron cannot be moved without first breaking the seal.

In its most approved form the seal includes a guard-cap, which is adapted to be applied over the head of the set-screw or set-screws or over the head of the nut of the lock-bolt which locks the nose-iron to the scale-lever, and it also includes means for locking said guard-cap in operative position, so that access cannot be had to the said set-screw or set-screws, bolt head or nut, as the case may be. The "guard-cap," so called, constitutes, broadly, a detainer for normally locking the nose-iron-locking device against rotation or releasing movement.

The invention is illustrated in the accompanying drawings, wherein like characters indicate like parts throughout the several views.

Figures 1, 2, and 3 are detail views, in side elevation, with some parts broken away, showing different forms of my improved seal applied in different ways to different arrangements of the nose-iron; and Figs. 4, 5, and 6 are sectional views, respectively, on the line $x^4 \; x^4$ of Fig. 1, on the line $x^5 \; x^5$ of Fig. 2, and on the line $x^6 \; x^6$ of Fig. 3.

The numeral 1 indicates the scale-lever, and the numeral 2 the nose-iron, which is adjustably secured thereto. In the construction illustrated in Figs. 1 and 4 the nose-iron 2 is held in its set adjustment on the lever 1 by a pair of set-screws 3, applied one through the side of the nose-iron and one through the top thereof. In the construction illustrated in Figs. 2 and 5 the nose-iron 2 is held in its set adjustment on the lever 1 by a pair of set-screws 4, passed through the same side of the nose-iron. In the construction illustrated in Figs. 3 and 6 the nose-iron is secured in its set adjustment on the lever 1 by a nutted bolt 5 6, the stem of which works through a slot 7 in the side of said nose-iron and the head $5^a$ of which is countersunk into one side of the lever, as shown by dotted lines in Fig. 6. The bolt 5 is by its countersunk head held against rotation, and its head is adapted to be clamped against the lever 1 by tightening the nut 6.

The sealing-cap 8 employed in connection with the construction illustrated in Figs. 1 and 4 is in the form of a channel-iron bent at right angles in two different directions and adapted to be placed over the heads of both of the set-screws 3, with its open side closely pressed against the nose-iron 2. Sealing-wires 9 are passed through lugs 10 on the sealing-cap 8, are tightly drawn against the nose-iron 2, and are brought together and secured by a sealing-slug 11, which is pressed or cast about the same.

When the sealing device is applied as illustrated in Figs. 1 and 4, access cannot be had to the heads of the set-screws 3, and hence, as is evident, said set-screws cannot be loosened, and the nose-iron cannot be readjusted or moved without first breaking the seal. The heads of the set-screws 3 so closely fit within the side flanges of the sealing-cap 8 that they cannot be rotated while the said cap is in working position.

The sealing-cap 12 illustrated in Figs. 2 and 5 is in the form of a straight channel-strip which is closed at one end, is open at its other end, and is formed with inturned flanges $12^a$, that engage under the shoulders of the heads of the two set-screws 4. This sealing-cap 12 is preferably secured in working position by a pair of sealing-wires 13, which are passed through the sides of said cap 12, one on each side of one of the set-screws 4, are twisted together, are closely drawn round the nose-iron 2, and are securely attached at their ends by a sealing-slug 11.

In the construction illustrated in Figs. 3 and 6 a rectangular sealing-cap 14 loosely fits over the nut 6 and has a perforation $14^a$, through which the threaded end of the bolt 5 is adapted to project. Sealing-wires 15 are passed through lugs $14^b$ on the cap 14, are tightly drawn around the nose-iron 2, and their ends are rigidly secured together by a sealing-slug 11.

As is evident, all of the described forms of the sealing device effectually prevent tampering with the nose-iron. It will of course be understood that the term "nose-iron" is herein used in a very broad sense and is not intended to limit the invention to any specific construction or arrangement. It will therefore be understood that the device described is capable of many modifications within the scope of my invention as herein set forth and claimed.

What I claim, and desire to secure by Letters Patent of the United States, is as follows:

In a weighing-scale, the combination with a nose-iron, a coöperating lever and a rotatable nose-iron-locking device, of a protecting-cap fitting over said rotary locking device, for preventing tampering therewith, and a frangible sealing connection normally holding said sealing-cap in working position, substantially as described.

In testimony whereof I affix my signature in presence of two witnesses.

CHARLES C. NEALE.

Witnesses:
  E. W. JEPPESEN,
  F. D. MERCHANT.